April 18, 1967 E. A. HORTON 3,314,559
VACUUM ATTACHMENT
Filed April 30, 1964 4 Sheets-Sheet 1
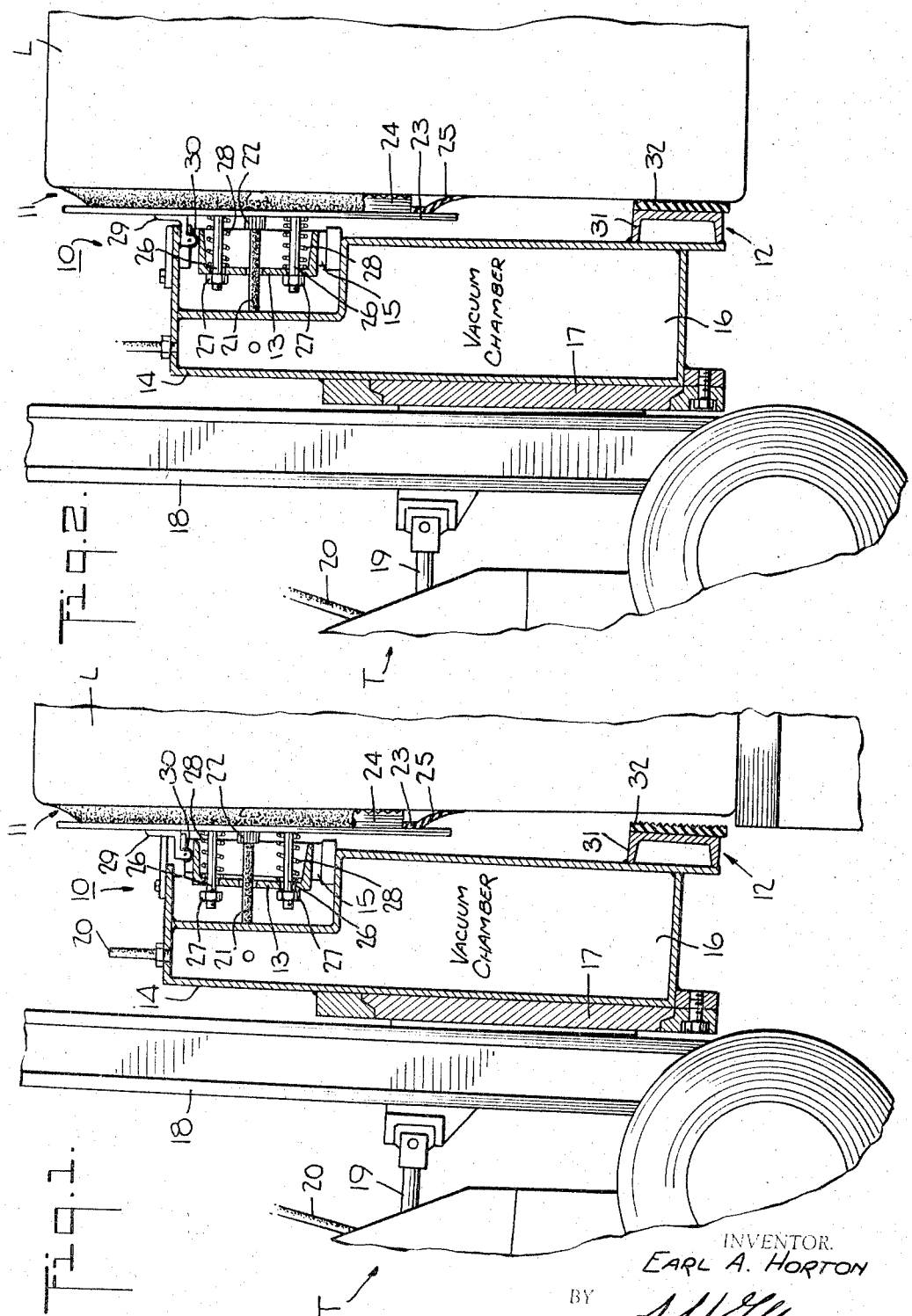
INVENTOR.
EARL A. HORTON
BY
ATTORNEY

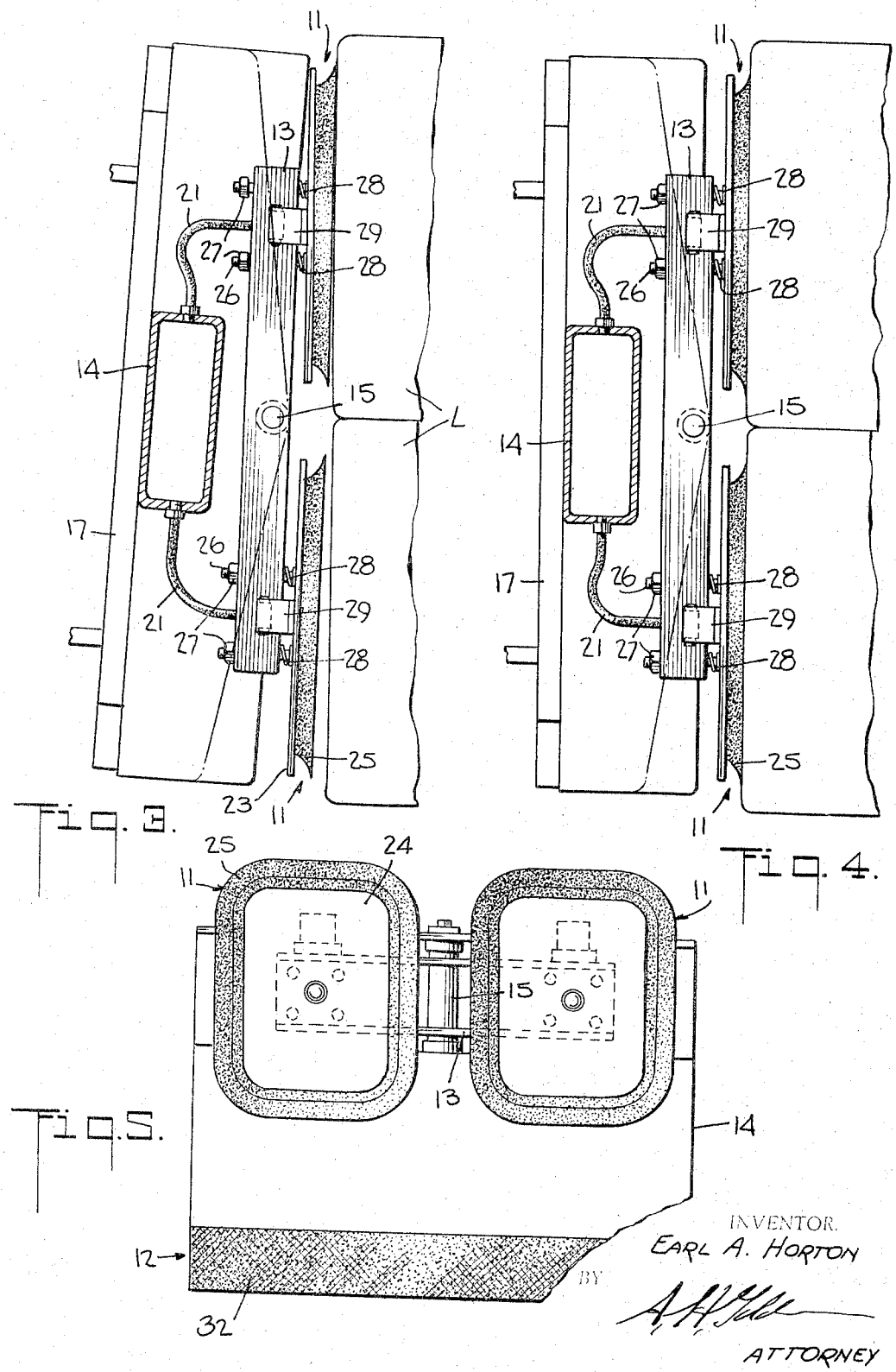

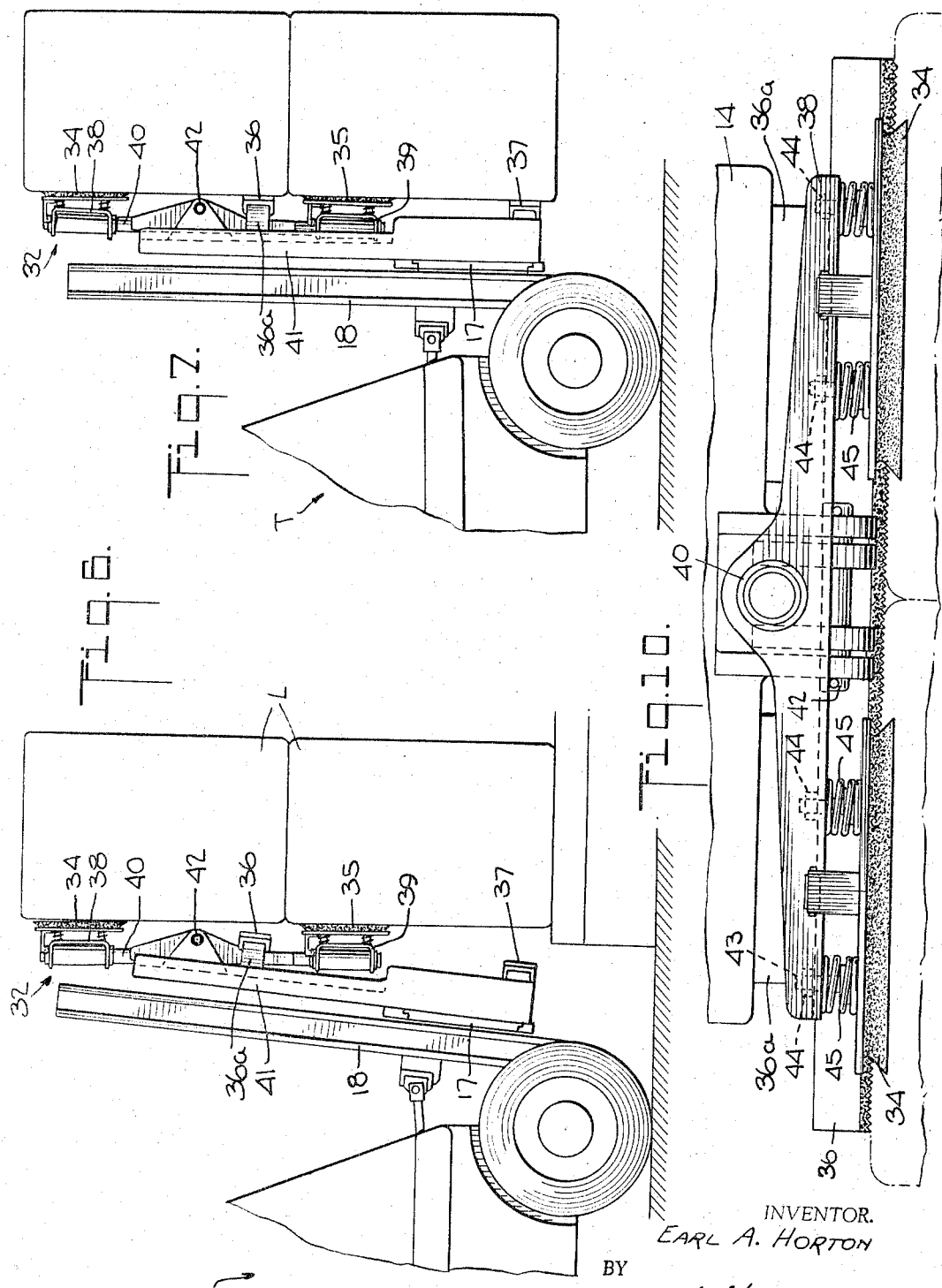

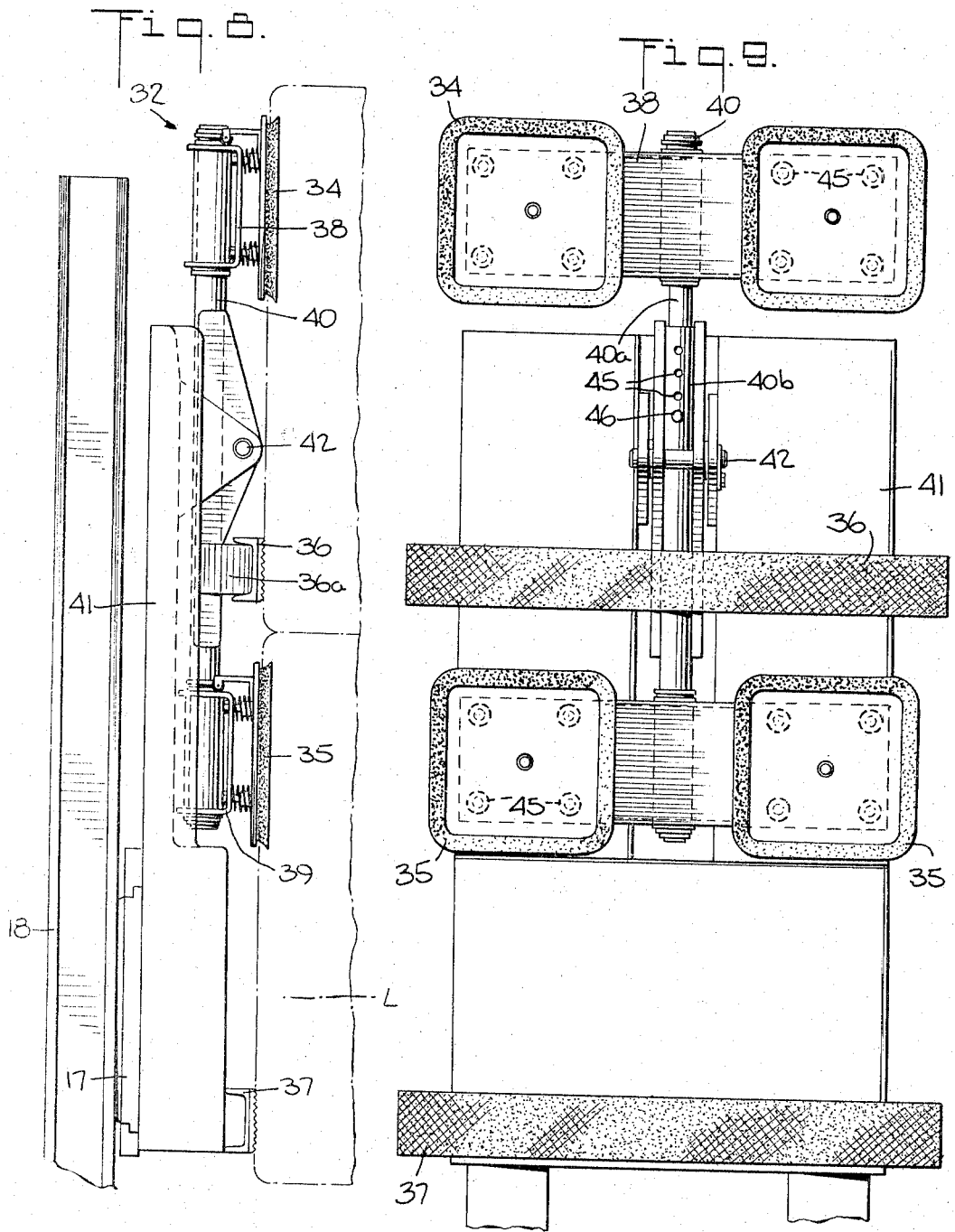

United States Patent Office 3,314,559
Patented Apr. 18, 1967

3,314,559
VACUUM ATTACHMENT
Earl A. Horton, Philadelphia, Pa., assignor to Eaton Yale & Towne Inc., a corporation of Ohio
Filed Apr. 30, 1964, Ser. No. 363,840
3 Claims. (Cl. 214—650)

This invention relates to a vacuum cup load gripping attachment for a lift truck of the type having a vacuum cup or cups positioned to grip a vertical side of the load.

The purpose of this invention is to increase the load supporting capacity of such an attachment without substantially increasing the cost of the attachment.

This is accomplished in accordance with my invention by mounting a simple, inexpensive friction pad below the vacuum cup with the friction surface of the pad positioned to engage a lower portion of the side of the load which is gripped by the vacuum cup. With this arrangement, when the load is gripped by the vacuum cup and lifted, the weight of the load acting through the center of gravity of the load, creates a torque or moment causing the lower portion of the side of the load to be forced against the friction pad. High frictional force is thereby provided between the pad and the side of the load which resists downward slipping of the load relatively to the vacuum cup. The load supporting capacity of the attachment is thereby materially increased.

As a feature of my invention I form the bottom of the vacuum cup with friction material to further increase the frictional resistance of the cup, and I so mount the vacuum cup and the friction pads that when the load is lifted the bottom surface of the vacuum cup and the surface of the friction pad are substantially coplanar. This prevents displacement of parts of a stacked load by the pad when the load is lifted and also insures contact of the side of the load with the full area of the pad, reducing unit pressure of the pad on the load to prevent crushing of the load.

As still a further feature I mount the attachment on the load carriage in a lift truck having forward tilting uprights, whereby the uprights may be tilted forwardly to project the cups in front of the friction pads to first engage the cups with the load and the uprights then tilted rearwardly to bring the side of the load in contact with the friction pads.

As still a further feature of the invention I provide at least two vertically spaced cups and a first friction pad positioned below the upper cup and above the lower cup and a second friction pad positioned below the lower cup. I mount the upper and lower cups on opposite ends of a common arm which is pivotally mounted intermediate its ends on a horizontal pivot, and mount the friction pads on the frame to which the arm on which the vacuum cups are mounted is pivotally attached. With this arrangement, I am able to project both the upper and lower cups forwardly of both friction pads by forward tilting of the uprights, while allowing both the upper and lower cups to be vertically and horizontally aligned to properly engage the load. When the uprights are tilted rearwardly, after the load has been gripped by the upper and lower vacuum cups, the surface of the load is brought into frictional engagement with both the upper and lower friction pads, with the cups aligned with the pads.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

FIG. 1 is a partial side elevational view of a lift truck incorporating a vacuum attachment constructed in accordance with the invention having two vacuum cups and a friction pad, showing the attachment being used to pick up a load, FIG. 2 is a view similar to FIG. 1 but showing the uprights of the truck tilted to the vertical position to lift the load and bring the surface of the load into engagement with the friction pad, FIG. 3 is a top plan view of the attachment as shown in FIG. 1, FIG. 4 is a top plan view of the attachment as shown in FIG. 2, FIG. 5 is a front elevational view of the attachment, FIG. 6 is a side elevational view of a lift truck incorporating an attachment constructed in accordance with the invention having four vacuum cups and two friction pads, showing the attachment being used to pick up a load, FIG. 7 is a view similar to FIG. 6, but showing the uprights tilted to the vertical position to bring the surface of the load into engagement with the friction pads, FIG. 8 is an enlarged side elevational view of the attachment as shown in FIG. 7, FIG. 9 is a front elevational view of the attachment as shown in FIG. 8, and FIG. 10 is a top plan view of the attachment as shown in FIG. 8.

Referring to the drawings, and in particular to FIGS. 1, 2 and 3, there is shown a vacuum cup load gripping attachment 10 constructed in accordance with the invention.

The attachment 10 includes, as best shown in FIG. 3, two vacuum cups 11 and a friction pad 12 positioned below the cups 11. Each of the cups 11 is mounted adjacent one end of a channel shaped arm 13. Arm 13, in turn, is mounted on a frame 14 for horizontal, pivotal rocking movement about its center by means of a vertical pivot 15, whereby the arm 13 may pivot as necessary to engage both vacuum cups 11 with the vertical surface of the load as the cups 11 are moved against the load. The friction pad 12 is rigidly fixed to the frame 14 adjacent the lower end of the frame, as best shown in FIG. 1.

The frame 14 is preferably made hollow to provide a vacuum chamber 16, and the frame 14 is mounted on a load carriage 17 of a conventional lift truck T so that the attachment 10 may be elevated on the uprights 18 of the truck in the conventional manner to lift a load gripped by the attachment. The uprights 18 are adapted to be tilted forwardly from the vertical position by tilt rams 19, partially shown in FIGS. 1 and 2.

The vacuum chamber 16 formed by the frame 14 is connected by suitable flexible hose 20 to a source of vacuum, such as a vacuum pump (not shown), provided on the truck T. As best shown in FIG. 3, each of the cups 11 is connected to the vacuum chamber 16 through a flexible hose 21 and a sensing valve 22, shown in FIG. 1, which is opened by contact with the load to apply vacuum to the cup.

Each of the cups 11 includes a rigid metal backplate 23, a center pad or sheet 24 bonded to the plate 23 and providing an outer surface having a high coefficient of friction, and a flexible, non-porous sealing lip 25 of rubber-like material surrounding the pad 24 and bonded to the plate 23. The pad 24 may be of any suitable material providing an outer surface having a high coefficient of friction. Thus the pad may be made of resilient rubber-like material, with the outer surface preferably roughened, as by knurling or ribbing, to increase the coefficient of friction. The pad may also be formed of aluminum silicate or diamond particles suitably bonded to a backing sheet or by a sheet of metal having sharp prongs struck up on the surface thereof.

Each of the cups 11 is mounted on the end of the arm 13 by four spaced bolts 26, each of which is secured to the rear surface of the backplate 23 of the cup 11 and extends through slightly over-sized holes in the web portion of the channel shaped arm 13. Each bolt 26 has a nut 27 threaded on the outer end thereof which holds the cup 11 assembled to the arm 13 and which limits outward movement of the cup 11 relatively to the arm 13. A compression spring 28 surrounds each bolt between the backplate 23 and the inner surface of the arm 13 and normally urges the cup 11 outwardly to the limit allowed by the nuts 27 on the ends of the bolts 26. A bracket 29 is secured to the backplate 23 of each cup 11 and carries a roller 30 which rides on the top of the flange of the arm 13, whereby the vertical force on the cup 11 is transmitted to the arm 13, instead of to the bolts 26 so that the bolts 26 are free to slide in the openings through the arm 13.

The friction pad 12 is conveniently formed by a channel 31, the legs of which are welded or otherwise secured to the forward face of the frame 14. A sheet or pad 32, providing an outer surface having a high coefficient of friction, is bonded to the outer surface of the channel 31. The pad 32 may be of any suitable material providing an outer surface having a high coefficient of friction, such as the materials described in connection with the pads 24 of the cups 11. Thus the pad 32 should have a coefficient of friction of at least .50 with kraft paper board, whereby the pad 32 will accept a large part of the vertical load when handling cartons or the like.

In utilizing the attachment 10 to pick up a load, such as indicated at L in FIGS. 1 and 2, the uprights 18 are first tilted forward to project the cups 11 forwardly of the friction pad 12, as shown in FIG. 1, and the truck moved toward the vertical surface of the load to engage the cups with the side of the load. If the cups are not perfectly aligned with the surface of the load, the arm 13 may rotate on the vertical pivot 15 relatively to the frame 14 to properly engage both cups 11 with the surface of the load. The cups 11 may also pivot or tilt sufficiently in the fore and aft direction through yielding of the springs 28 and inward movement of the bolts 26 relatively to the arm 13, as shown in FIG. 1. As the cups 11 are pressed against the side of the load, the lips 25 of the cups flex so that the outer surfaces of the center pads 24 of the cups 11 are brought into contact with the side of the load. At the same time, the sensing valves 22 are actuated by contact with the load to apply vacuum to the cups 11 to hold the surface of the load in frictional engagement with the center pads 24.

After the load L is gripped by the vacuum cups 11, the load is lifted from its support by a backward tilting of the uprights 18 and elevation of the load carriage 17, as shown in FIG. 2. When the load is so lifted, the weight of the load acting through its center of gravity creates a torque or moment causing the lower portion of the side of the load to be forced against the friction surface 32 of the friction pad 12, whereby high frictional force is provided between the pad 12 and the side of the load resisting downward slipping of the load relatively to the vacuum cups 11.

When the load is lifted the cups 11 are pulled outwardly by the load to the limit allowed by the nuts 27 on the bolts 26. As an important feature of the invention the nuts 27 on the bolts 26 are so adjusted that outward movement of the vacuum cups 11 relatively to the arm 13 and frame 14 is limited to a position in which the outer friction surface of the center pad 24 of the cups and the surface of the friction pad are substantially coplanar, as shown in FIG. 2. This prevents displacement of parts of a stacked load by the pad 12 and also insures contact of the side of the load with the full area of the friction pad 12, thereby reducing the unit pressure exerted on the load by the pad 12 to prevent crushing of the load.

Referring now to FIGS. 6 through 10, there is shown a vacuum attachment 33 constructed in accordance with the invention for handling larger loads. The attachment 33 includes two upper vacuum cups 34 and two lower vacuum cups 35. The attachment 33 also includes a friction pad 36 positioned between the upper and lower cups 34 and 35 and a friction pad 37 positioned below the lower cups 35.

Each of the upper cups 34 is mounted on one end of a transversely extending horizontal arm 38, and each of the lower cups 35 is mounted on one end of a transversely extending horizontal arm 39. The arm 38 is pivotally mounted on the upper end of a vertically extending arm 40 whereby the arm 38 may pivot or rock in a horizontal plane to align the cups 34 with the surface of the load, and the arm 39 may pivot or rock in a horizontal plane to align the cups 35 with the surface of the load. The arm 40 in turn is pivotally mounted on a frame 41 by a horizontal pivot 42, and when the uprights 18 are tilted forwardly as shown in FIG. 6, to allow alignment of both the upper cups 34 and the lower cups 35 with the surface of the load the arm 40 may rock or pivot.

The friction pad 36 is rigidly secured to brackets 36a which in turn are secured to the front surface of the frame 41 between the upper and lower cups 34 and 35. The brackets 36a are spaced apart at their inner ends as shown in FIG. 10 to provide clearance for allowing pivoting or rocking of the arm 40. The lower friction pad 37 is rigidly secured to the lower front surface of the frame 41.

The frame 41 is preferably made hollow to provide a vacuum chamber and each of the cups 34 and 35 are connected with the vacuum chamber by flexible hose, not shown, in the same manner as described in connection with the attachment 10 shown in FIG. 1. When the uprights are in the vertical position as shown in FIG. 7, the arm 40 is prevented from pivoting forward in a clockwise direction by engagement of the lower end of the arm 40 with the frame 41. The frame 41 is mounted on the load carriage 17 of the lift truck T as previously described in connection with the attachment 10.

Each of the cups 34 is of the same construction as the cups 11 shown in FIG. 1, and the cups are mounted on the arm 38 in a similar manner as described in connection with the cups 11 of the attachment 10 of FIG. 1 by means of bolts 43 having stop nuts 44 threaded on the ends thereof and having springs 45 which normally urge the cups 34 outwardly of the arm 38 to the limit allowed by the nuts 44. The lower cups 35 are mounted in the same manner on the ends of the arm 39.

The friction pads 36 and 37 are also of similar construction to that described in connection with the friction pad 12 of the attachment 10 shown in FIG. 1.

In using the attachment 33 to pick up a load L, the uprights 18 of the truck T are tilted forwardly, as shown in FIG. 6, so that both the upper and lower cups 34 and 35 may project forwardly of both the friction pad 36 and the friction pad 37. This is possible due to the mounting of the cups on the arm 40, which may pivot about the horizontal pivot 42. When the cups 34 and 35 have gripped the load, the side of the load is brought into frictional engagement with the outer friction surfaces of both the friction pads 36 and 37 by backward tilting of the uprights, as shown in FIG. 7. When the load is thereafter lifted, the weight of the load creates a torque pressing the side of the load tightly against both the friction pads 36 and 37, whereby the friction pads 36 and 37 accept the vertical component of force of the load to resist downward slipping of the load relatively to the cups 34 and 35.

As described in connection with the attachment 10 shown in FIG. 1, the stop nuts 44 which are threaded on the ends of the bolts 43 which support the cups 34 and 35 on the arms 38 and 39 are so adjusted that outward movement of the cups 34 and 35 relatively to the arms 38 and 39 is limited to a position in which the bottoms of the cups 34 and 35 are substantially coplanar with the outer surfaces of the friction pads 36 and 37.

As best shown in FIG. 9, the vertical arm 40 is preferably made in two telescoping portions including a shaft 40a and a tube 40b whereby the upper cups 34 may be raised or lowered to accommodate loads of various height. The tube 40b is provided with a series of openings 45, and the shaft 40a may be locked in any of a number of adjusted positions by inserting a locking screw or pin 46 through one of the openings 45 and an opening provided through the lower end of the shaft 40a.

I now claim:

1. In a lift truck having uprights and a load carriage mounted for vertical movement on the uprights, a horizontal arm, means mounting said arm on said load carriage for horizontal rocking movement about a vertical axis at a medial part of said arm, a vacuum cup secured to each end of said arm in position to engage the vertical surface of a load, a friction pad secured against horizontal rocking movement on said carriage below said arm in a position to also engage a lower portion of the vertical surface of said load whereby when the vertical surface of the load is gripped by said vacuum cups and the load lifted by vertical movement on said uprights the weight of the load creates a moment causing the lower portion of the vertical surface of the load to be forced against said friction pad, and said arm by rocking enabling said vacuum cups to hold the load in a relation to the friction pad that will cause effective load supporting friction between the load and pad.

2. A combination as set forth in claim 1, and including means mounting the truck uprights for forward tilting movement, a vertical arm forming a part of the means that mount said horizontal arm on the load carriage, means on said carriage mounting said vertical arm for rocking movement about a horizontal axis at a medial part of said vertical arm, pivot means supporting said horizontal arm for its horizontal rocking movement on the upper end portion of the vertical arm, the vacuum cups on said horizontal arm forming upper vacuum cups, lower vacuum cups mounted on the lower end portion of the vertical arm in position to engage the vertical surface of the load, and said friction pad being secured in position between the upper and lower vacuum cups and below the horizontal axis in which the vertical arm rocks, so that the truck uprights when tilted forwardly will project the upper and lower cups forwardly of the friction pad through pivoting of said vertical arm, and when the truck uprights are tilted rearwardly and the load is lifted by vertical movement of the load carriage, the moment due to the weight of the load will take effect relatively to said friction pad.

3. A combination as set forth in claim 2, and further including a lower horizontal arm having opposed ends on which the lower vacuum cups are mounted, means mounting said lower arm for horizontal rocking movement on the lower end portion of the vertical arm, and a second friction pad secured in position on the load carriage below the lower vacuum cups, the rearward tilting of the truck uprights and the lifting of the load causing a portion of the vertical load surface to move against said second friction pad.

References Cited by the Examiner

UNITED STATES PATENTS

| | | |
|---|---|---|
| 2,942,745 | 6/1960 | Horton. |
| 3,040,920 | 6/1962 | Harris. |
| 3,054,521 | 9/1962 | Harris et al. |
| 3,139,301 | 6/1964 | Olson et al. |
| 3,147,872 | 9/1964 | Olson. |

FOREIGN PATENTS 1,316,425  12/1962  France.

GERALD M. FORLENZA, *Primary Examiner.*

R. B. JOHNSON, *Assistant Examiner.*